US012525730B2

(12) United States Patent
Oh et al.

(10) Patent No.: US 12,525,730 B2
(45) Date of Patent: Jan. 13, 2026

(54) ANTENNA MODULE AND ELECTRONIC DEVICE COMPRISING SAME

(71) Applicant: Samsung Electronics Co., Ltd., Suwon-si (KR)

(72) Inventors: Junhwa Oh, Suwon-si (KR); Chanju Park, Suwon-si (KR); Jungi Jeong, Suwon-si (KR); Sanghyuk Wi, Suwon-si (KR); Sungtae Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 18/275,334

(22) PCT Filed: Jan. 27, 2022

(86) PCT No.: PCT/KR2022/001443
§ 371 (c)(1),
(2) Date: Aug. 1, 2023

(87) PCT Pub. No.: WO2022/169195
PCT Pub. Date: Aug. 11, 2022

(65) Prior Publication Data

US 2024/0120667 A1 Apr. 11, 2024

(30) Foreign Application Priority Data

Feb. 2, 2021 (KR) ........................ 10-2021-0014836

(51) Int. Cl.
*H01Q 21/28* (2006.01)
*H01Q 1/24* (2006.01)
(Continued)

(52) U.S. Cl.
CPC ............. *H01Q 21/28* (2013.01); *H01Q 1/243* (2013.01); *H01Q 1/38* (2013.01); *H01Q 21/065* (2013.01)

(58) Field of Classification Search
CPC .......... H01Q 21/28; H01Q 1/243; H01Q 1/38; H01Q 21/065; H01Q 1/2283; H04B 1/3827
See application file for complete search history.

(56) References Cited

U.S. PATENT DOCUMENTS 4,356,462 A * 10/1982 Bowman ................... H01P 5/12 333/136
9,620,464 B2 * 4/2017 Baks .................... H01Q 9/0457
(Continued)

FOREIGN PATENT DOCUMENTS

GB 2559001 A 7/2018
JP 2014-170989 A 9/2014
(Continued)

OTHER PUBLICATIONS

Extended European Search Report dated May 23, 2024; European Appln. No. 22749946.4-1201 / 4274022 PCT/KR2022001443.
(Continued)

*Primary Examiner* — Dameon E Levi
*Assistant Examiner* — Jordan E. DeWitt
(74) *Attorney, Agent, or Firm* — Jefferson IP Law, LLP

(57) ABSTRACT

The present disclosure relates to a 5G or 6G communication system for supporting a higher data transmission rate beyond a 4G communication system such as LTE. The antenna module may comprise: a communication circuit; an antenna unit comprising a plurality of first antenna elements forming a sub-array; a feeding network unit that is disposed below the antenna unit, and is configured to provide at least one first transmission line that is branched to the positions of the
(Continued)

plurality of first antenna elements so that the plurality of first antenna elements form the same phase; a mounting unit that is disposed below the feeding network unit, and comprises a plurality of vias such that transmit and/or receive power of the communication circuit is provided to the antenna unit; and a routing unit that is disposed between the feeding network unit and the communication circuit, and is configured to provide at least one second transmission line that extends from a position corresponding to an output end of the communication circuit to a position corresponding to an input end of the feeding network unit in at least one layer.

14 Claims, 14 Drawing Sheets

(51) Int. Cl.
*H01Q 1/38* (2006.01)
*H01Q 21/06* (2006.01)

(56) References Cited

U.S. PATENT DOCUMENTS

| | | | | |
|---|---|---|---|---|
| 11,742,587 | B2 * | 8/2023 | Jeong | H01P 5/028 343/770 |
| 12,183,977 | B2 * | 12/2024 | Jeong | H01Q 1/2283 |
| 2007/0263748 | A1 * | 11/2007 | Mesecher | H01Q 3/2611 375/299 |
| 2009/0153264 | A1 * | 6/2009 | Tanpo | H01P 1/2136 333/103 |
| 2012/0235880 | A1 | 9/2012 | Kim et al. | |
| 2017/0125895 | A1 | 5/2017 | Baks et al. | |
| 2017/0207547 | A1 | 7/2017 | Zhai et al. | |
| 2017/0272070 | A1 * | 9/2017 | Uejima | H02J 1/02 |
| 2018/0076526 | A1 | 3/2018 | Garcia et al. | |
| 2018/0159203 | A1 * | 6/2018 | Baks | H01Q 9/045 |
| 2019/0013580 | A1 | 1/2019 | Vigano et al. | |
| 2019/0089069 | A1 * | 3/2019 | Niroo | H01Q 13/10 |
| 2019/0260109 | A1 * | 8/2019 | Gu | H01L 23/3675 |
| 2019/0319338 | A1 * | 10/2019 | Gu | H01L 22/32 |
| 2020/0006864 | A1 | 1/2020 | Naruse | |
| 2020/0058987 | A1 | 2/2020 | Pelletti et al. | |
| 2020/0083948 | A1 * | 3/2020 | Lim | H04B 7/0814 |
| 2020/0127386 | A1 | 4/2020 | Yekan et al. | |
| 2020/0203801 | A1 | 6/2020 | Im et al. | |
| 2020/0235487 | A1 | 7/2020 | Gonzalez et al. | |
| 2020/0259251 | A1 * | 8/2020 | Seo | H01Q 1/1221 |
| 2020/0295429 | A1 * | 9/2020 | Yoshida | H01Q 13/106 |
| 2020/0312797 | A1 | 10/2020 | Kang et al. | |
| 2020/0395660 | A1 * | 12/2020 | Kuroda | H01Q 1/22 |
| 2021/0296773 | A1 * | 9/2021 | Baniya | H05K 1/181 |
| 2024/0120642 | A1 * | 4/2024 | Park | H01Q 21/0075 |
| 2024/0120667 | A1 * | 4/2024 | Oh | H01Q 1/38 |

FOREIGN PATENT DOCUMENTS

| | | | |
|---|---|---|---|
| KR | 10-2012-0104896 | A | 9/2012 |
| KR | 10-2020-0076379 | A | 6/2020 |
| KR | 10-2020-0114084 | A | 10/2020 |
| WO | 18-198754 | A1 | 11/2018 |

OTHER PUBLICATIONS

International Search Report and written opinion dated May 12, 2022, issued in International Application No. PCT/KR2022/001443.

Korean Office Action with English translation dated Mar. 19, 2025; Korean Appln. No. 10-2021-0014836.

* cited by examiner

2 X 1 subarray

2 X 2 subarray

4 X 1 subarray

4 X 2 subarray

| AiP Stack-up (300) | | | | |
|---|---|---|---|---|
| Layer | Layer Num. | Material | Thickness [um] | Usage |
| | | SR | 15 | |
| Antenna Unit (301) | Layer 1 | CU | 15 | Stacked Patch |
| | | PPG | 40 | |
| | Layer 2 | CU | 15 | Radiator |
| | | PPG | 40 | |
| | Layer 3 | CU | 15 | Dummy, HIS |
| | | PPG | 40 | |
| | Layer 4 | CU | 15 | Dummy, HIS |
| | | PPG | 40 | |
| Feeding Network Unit (320) | Layer 5 | CU | 15 | Ground |
| | | PPG | 40 | |
| | Layer 6 | CU | 15 | Series/Hybrid/Corporate Top Feeding |
| | | PPG | 40 | |
| | Layer 7 | CU | 15 | Ground |
| Routing Unit (330) | Core | CCL | 150 | |
| | Layer 8 | CU | 15 | Ground |
| | | PPG | 40 | |
| | Layer 9 | CU | 15 | Routing/Corporate Bottom Feeding |
| | | PPG | 40 | |
| | Layer 10 | CU | 15 | Ground |
| RFIC Layer (303) | | PPG | 40 | |
| | Layer 11 | CU | 15 | RFIC |
| | | PPG | 40 | |
| | Layer 12 | CU | 15 | RFIC |
| | | PPG | 40 | |
| | Layer 13 | CU | 15 | RFIC |
| | | PPG | 40 | |
| | Layer 14 | CU | 15 | Ground |
| | | SR | 15 | |
| | | | 870 | |

FIG. 16

ANTENNA MODULE AND ELECTRONIC DEVICE COMPRISING SAME

CROSS-REFERENCE TO RELATED APPLICATION(S)

This application is a U.S. National Stage application under 35 U.S.C. § 371 of an International application number PCT/KR2022/001443, filed on Jan. 27, 2022, which is based on and claimed priority of a Korean patent application number 10-2021-0014836, filed on Feb. 2, 2021, in the Korean Intellectual Property Office, the disclosure of which is incorporated by reference herein in its entirety.

TECHNICAL FIELD

Various embodiments of the disclosure relate to an antenna module and an electronic device including the antenna module.

BACKGROUND ART

Wireless communication technologies have been developed mainly for human services, such as voice, multimedia, and data communication. As 5th-generation (5G) communication systems are commercially available, connected devices are expected to explosively increase and to be connected to a communication network. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In the 6th-generation (6G) era, efforts are being made to develop an enhanced 6G communication system to provide various services by connecting hundreds of billions of devices and things. For this reason, the 6G communication system is called a beyond 5G system.

In the 6G communication system expected to be realized around year 2030, the maximum transmission rate is tera (i.e., 1000 gigabit) bps, and the wireless latency is 100 microseconds (μsec). In other words, the transmission rate of the 6G communication system is 50 times faster than that of the 5G communication system, and the wireless latency is reduced to one tenth.

To achieve these high data rates and ultra-low latency, 6G communication systems are considered to be implemented in terahertz bands (e.g., 95 gigahertz (95 GHz) to 3 terahertz (3 THz) bands). As the path loss and atmospheric absorption issues worsen in the terahertz band as compared with millimeter wave (mmWave) introduced in 5G, technology that may guarantee signal reach, that is, coverage, would become more important. As major techniques for ensuring coverage, there need to be developed multi-antenna transmission techniques, such as new waveform, beamforming, massive multiple-input and multiple-output (MIMO), full dimensional MIMO (FD-MIMO), array antennas, or large-scale antennas, which exhibit better coverage characteristics than radio frequency (RF) devices and orthogonal frequency division multiplexing (OFDM). New technologies, such as a metamaterial-based lens and antennas, high-dimensional spatial multiplexing technology using an orbital angular momentum (OAM), and a reconfigurable intelligent surface (RIS), are being discussed to enhance the coverage of the terahertz band signals.

For 6G communication systems to enhance frequency efficiency and system network for 6G communication systems include full-duplex technology, there are being developed full-duplex technology in which uplink and downlink simultaneously utilize the same frequency resource at the same time, network technology that comprehensively use satellite and high-altitude platform stations (HAPSs), network architecture innovation technology that enables optimization and automation of network operation and supports mobile base stations, dynamic spectrum sharing technology through collision avoidance based on prediction of spectrum usages, artificial intelligence (AI)-based communication technology that uses AI from the stage of designing and internalizes end-to-end AI supporting function to thereby optimize the system, and next-generation distributed computing technology that realizes services that exceed the limitation of the UE computation capability by ultra-high performance communication and mobile edge computing (MEC) or clouds. Further, continuous attempts have been made to reinforce connectivity between device, further optimizing the network, prompting implementation of network entities in software, and increase the openness of wireless communication by the design of a new protocol to be used in 6G communication systems, implementation of a hardware-based security environment, development of a mechanism for safely using data, and development of technology for maintaining privacy.

Such research and development efforts for 6G communication systems would implement the next hyper-connected experience via hyper-connectivity of 6G communication systems which encompass human-thing connections as well as thing-to-thing connections. Specifically, the 6G communication system would be able to provide services, such as truly immersive extended reality (XR), high-fidelity mobile hologram, and digital replica. Further, services, such as remote surgery, industrial automation and emergency response would be provided through the 6G communication system thanks to enhanced security and reliability and would have various applications in medical, auto, or home appliance industries.

A communication system may include a transmission (Tx) and reception (Rx) integrated circuit for generating a transmission/reception signal and an antenna element for transmitting the signal as a radio wave. To reduce transmission line loss as the use frequency of the antenna increases, a combined form (e.g., an RFIC) of an antenna and a communication circuit is being developed. Further, to obtain a high antenna gain at ultra-high frequencies, antenna elements having a designated arrangement may generally be used.

DETAILED DESCRIPTION OF THE INVENTION

Technical Problem

In the antenna structure, the physical size of the antenna element gradually decreases as the ultra-high frequency band is used, but the number of inputs and outputs of the communication circuit (e.g., RFIC) does not decrease nor does the physical size change. If the size of the antenna element becomes smaller than that of the communication circuit in an ultra-high frequency band, space for connecting a signal transmission line between the antenna element and the communication circuit becomes insufficient, and it may be difficult to design an antenna module (or package) structure. Further, it may be impossible to form an array configuration between antenna elements requiring a constant interval, and the interval between antenna elements for the ultra-high frequency band should be narrowed but, when the interval between antenna elements is increased to form a module, the beam steering characteristic may deteriorate.

According to various embodiments of the disclosure, it is possible to maximize physical space utilization and minimize signal transmission line loss by designing an antenna module adopting a sub-array antenna structure.

Technical Solution

According to various embodiments of the disclosure, an antenna module may comprise a communication circuit, an antenna unit including a plurality of first antenna elements forming a sub-array, a feeding network unit disposed below the antenna unit and configured to provide at least one first transmission line branched to positions of the plurality of first antenna elements so that the plurality of first antenna elements form the same phase, a mounting unit disposed under the feeding network unit and including a plurality of vias to provide transmission and/or reception outputs of the communication circuit to the antenna unit, and a routing unit disposed between the feeding network unit and the communication circuit unit and configured to provide at least one second transmission line extending from a position corresponding to an output end of the communication circuit to a position corresponding to an input end of the feeding network unit on at least one layer.

Advantageous Effects

According to various embodiments of the disclosure, there may be provided an antenna module structure applicable at ultra-high frequencies (or antenna in package).

According to various embodiments of the disclosure, in the antenna module, as the signal transmission line connected from the antenna structure including the sub-array antenna element and the communication circuit to the antenna element is designed to be branched, it is possible to maximize physical space utilization and minimize signal transmission line loss.

According to various embodiments of the disclosure, the antenna module is designed to have a specific function and independence for each layer to optimize the internal structure of the module to thereby provide efficiency in module development.

BRIEF DESCRIPTION OF DRAWINGS

FIG. 16 is a view schematically illustrating a stacked structure of an antenna module according to various embodiments of the disclosure.

MODE FOR CARRYING OUT THE INVENTION

Figure 1:
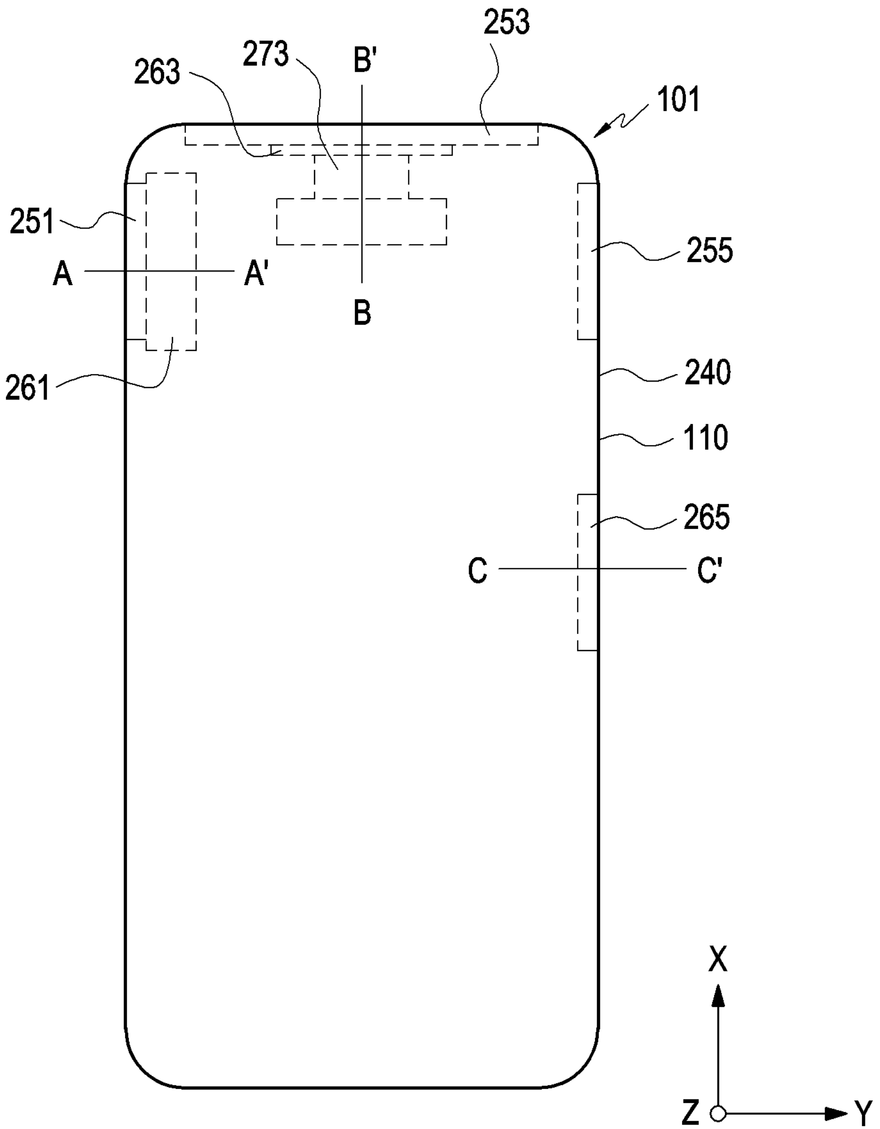
FIG. 1 illustrates an embodiment of a structure of an electronic device according to various embodiments of the disclosure.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although an antenna module disposed in a mobile device is described below, embodiments of the disclosure are not limited thereto, but may be likewise applied to base stations (or backhaul). The base station may be an entity allocating resource to terminal and may be at least one of gNode B, eNode B, Node B, base station (BS), wireless access unit, base station controller, or node over network. The terminal may include UE (user equipment), MS (mobile station), cellular phone, smartphone, computer, or multimedia system capable of performing communication functions. In the disclosure, downlink (DL) refers to a wireless transmission path of signal transmitted from the base station to the terminal, and uplink (UL) refers to a wireless transmission path of signal transmitted from the terminal to the base station. Although fifth-generation mobile communication technology (5G, new radio, or NR), LTE or LTE-A systems may be described below as an example, the embodiments may be applied to other communication systems having a similar technical background or channel pattern. For example, sixth-generation mobile communication technology (6G) developed after 5G mobile communication technology may be included therein, and 6G below may be a concept including legacy 5G, LTE, LTE-A and other similar services. Further, the embodiments may be modified in such a range as not to significantly depart from the scope of the present invention under the determination by one of ordinary skill in the art and such modifications may be applicable to other communication systems.

Figure 2:
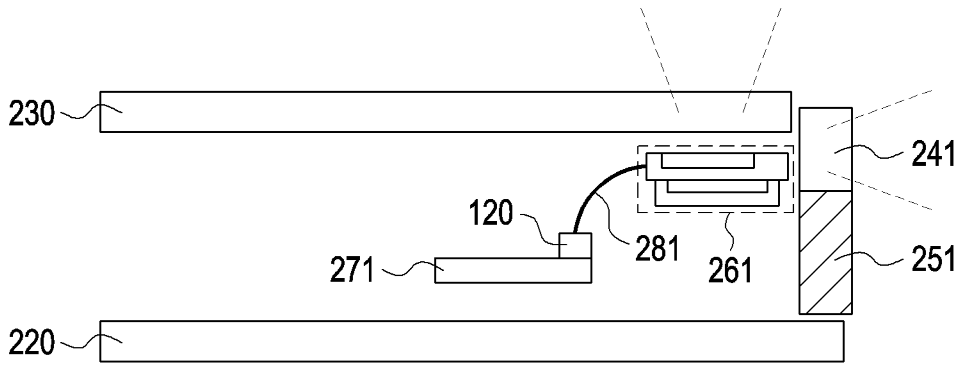
FIG. 2 is a cross-sectional view taken along axis A-A' of FIG. 1.
Figure 3:
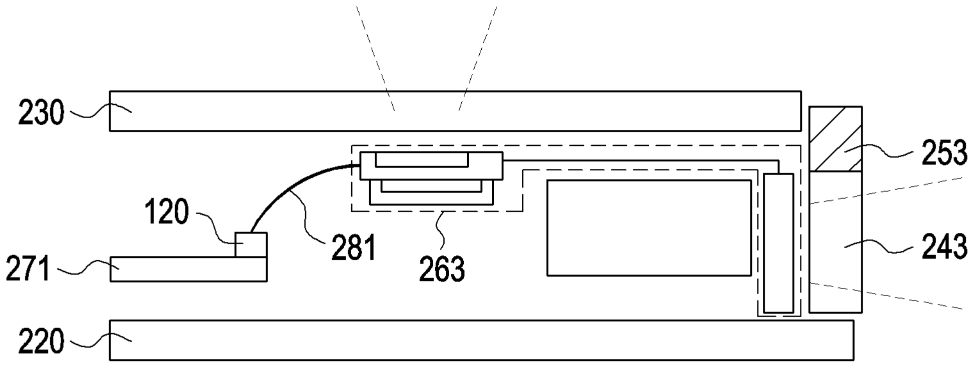
FIG. 3 is a cross-sectional view taken along axis B-B' of FIG. 1.
Figure 4:
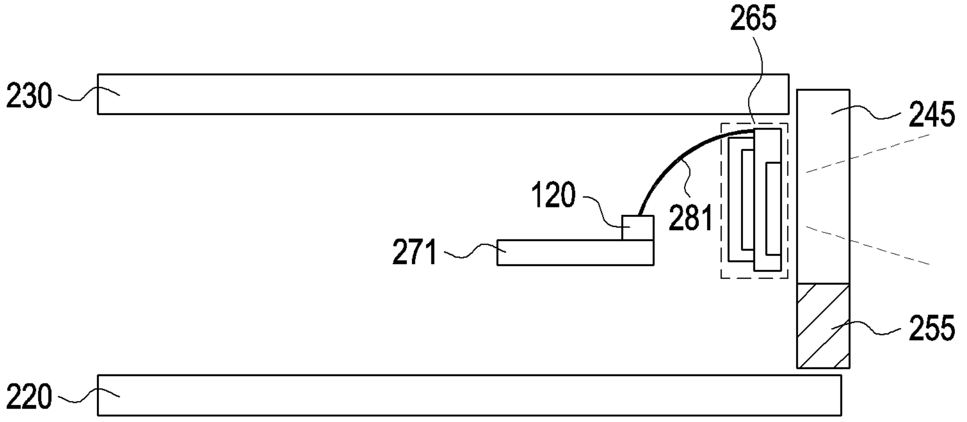
FIG. 4 is a cross-sectional view taken along axis C-C' of FIG. 1.

FIG. 1 illustrates an embodiment of a structure of an electronic device according to various embodiments of the disclosure. FIG. 2 is a cross-sectional view taken along axis A-A' of FIG. 1. FIG. 3 is a cross-sectional view taken along axis B-B' of FIG. 1. FIG. 4 is a cross-sectional view taken along axis C-C' of FIG. 1.

Referring to FIGS. 1 to 4, an electronic device 101 may include a housing 310 that includes a first plate 220 (e.g., the front plate), a second plate 230 (e.g., the rear plate or rear glass) spaced apart from the first plate 220 and facing in the opposite direction, and a side surface member 240 surrounding a space between the first plate 220 and the second plate 230.

According to an embodiment, the first plate 220 may include a transparent material including a glass plate. The second plate 230 may include a non-conductive and/or conductive material. The side surface member 240 may include a conductive material and/or a non-conductive material. In an embodiment, at least a portion of the side surface member 240 may be integrally formed with the second plate 230. In an embodiment, the side surface member 240 may include a first insulator to a third insulator 241, 543, and 545, and a first conductor to a third conductor 251, 253, and 255. In another example, the side surface member 240 may omit one of the first insulator to third insulator 241, 243, and 245, and/or the first conductor to the third conductor 251, 253, and 255. For example, if the first to third insulators 241, 243, and 245 are omitted, the portions of the first to third insulators 241, 243, and 245 may be formed of conductors. As another example, if the first to third conductors 251, 253, and 255 are omitted, the portions of the first to third conductors 251, 253, and 255 may be formed of insulators.

According to an embodiment, the electronic device 101 may further include, in the space, a display disposed to be seen through the first plate 220, a main printed circuit board (PCB) 271, and/or a mid-plate (not shown). Optionally, the electronic device 101 may further include other various components.

According to an embodiment, the electronic device 101 may include a first antenna (e.g., the first conductor 251), a second antenna (e.g., the second conductor 253), or a third antenna (e.g., the third conductor 255) in the space and/or in a portion (e.g., the side surface member 240) of the housing 310. For examples, the first to third antennas may be used as radiators of antennas supporting, e.g., cellular communication (e.g., second generation (2G), 3G, 4G, or LTE), short-range communication (e.g., Wi-Fi, Bluetooth, or NFC), and/or global navigation satellite system (GNSS).

According to an embodiment, the electronic device 101 may include a first antenna module 261, a second antenna module 263, and/or a third antenna module 265 to form directional beams. For example, the antenna modules 261, 263, and 265 may be used for 5G network communication, mmWave communication, 60 GHz communication, WiGig communication, or 6G network communication. In one embodiment, the antenna modules 261 to 265 may be disposed in the space to be spaced apart from metal members (e.g., the housing 110, the internal component 273, and/or the first to third antennas) of the electronic device 101. As another example, the antenna modules 261 to 265 may be disposed in the space to contact the metal members (e.g., the housing 310, and/or the first to third conductors 251 to 255) of the electronic device 101.

Referring to FIG. 1, according to an embodiment, the first antenna module 261 may be positioned at the left top (−Y axis), the second antenna module 263 may be positioned at the middle top (X axis), and the third antenna module 265 may be positioned at the right middle (Y axis). According to another embodiment, the electronic device 101 may include additional antenna modules in additional positions (e.g., the middle bottom (−Y axis)), or some of the first to third antenna modules 261 to 265 may be omitted. According to an embodiment, the first to third antenna modules 261 to 265 may be electrically connected with at least one communication processor 120 on the PCB 271 using a conductive line 281 (e.g., a coaxial cable or FPCB).

Referring to FIG. 2 illustrating a cross-section taken along the axis A-A' of FIG. 1, in a first antenna module 261 including a first antenna array (not shown) or a second antenna array (not shown), the first antenna array may be disposed to radiate towards the second plate 230, and the second antenna array may be disposed to radiate through the first insulator 241.

Referring to FIG. 3 which is a cross-sectional view taken along the axis B-B' of FIG. 1, a first antenna array of a second antenna module 263 may be disposed to radiate towards the second plate 230, and a second antenna array may be disposed to radiate through the second insulator 243. In an embodiment, the first antenna array or the second antenna array may include a dipole antenna, a patch antenna, a monopole antenna, a slot antenna, or a loop antenna.

In an embodiment, the second antenna module 263 may include a first printed circuit board and a second printed circuit board electrically connected with the first printed circuit board. The first antenna array may be disposed on the first printed circuit board. The second antenna array may be disposed on the second printed circuit board. According to an embodiment, the first printed circuit board and the second printed circuit board may be connected through a flexible printed circuit board or a coaxial cable. The flexible printed circuit board or the coaxial cable may be disposed around an electrical object (e.g., a receiver, a speaker, sensors, a camera, an ear jack or a button).

Referring to FIG. 4 which is a cross-sectional view taken along the axis C-C' of FIG. 1, the third antenna module 265 may be disposed to radiate towards the side surface member 240 of the housing 310. For example, the antenna array of the third antenna module 265 may be disposed to radiate through the third insulator 245.

Figure 5:
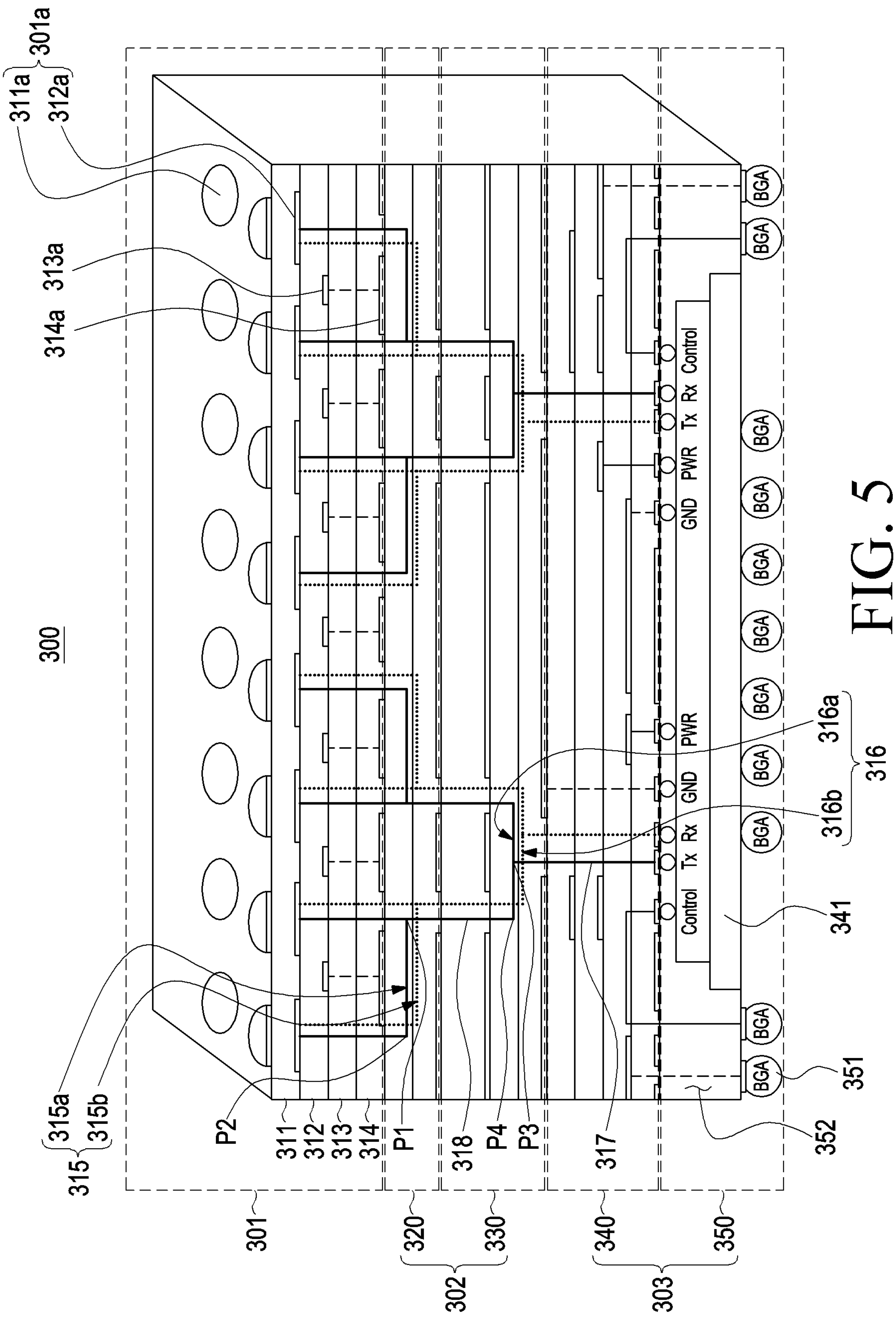
FIG. 5 is a cross-sectional view illustrating an antenna module disposed in an electronic device according to one of various embodiments of the disclosure.
Figure 6:
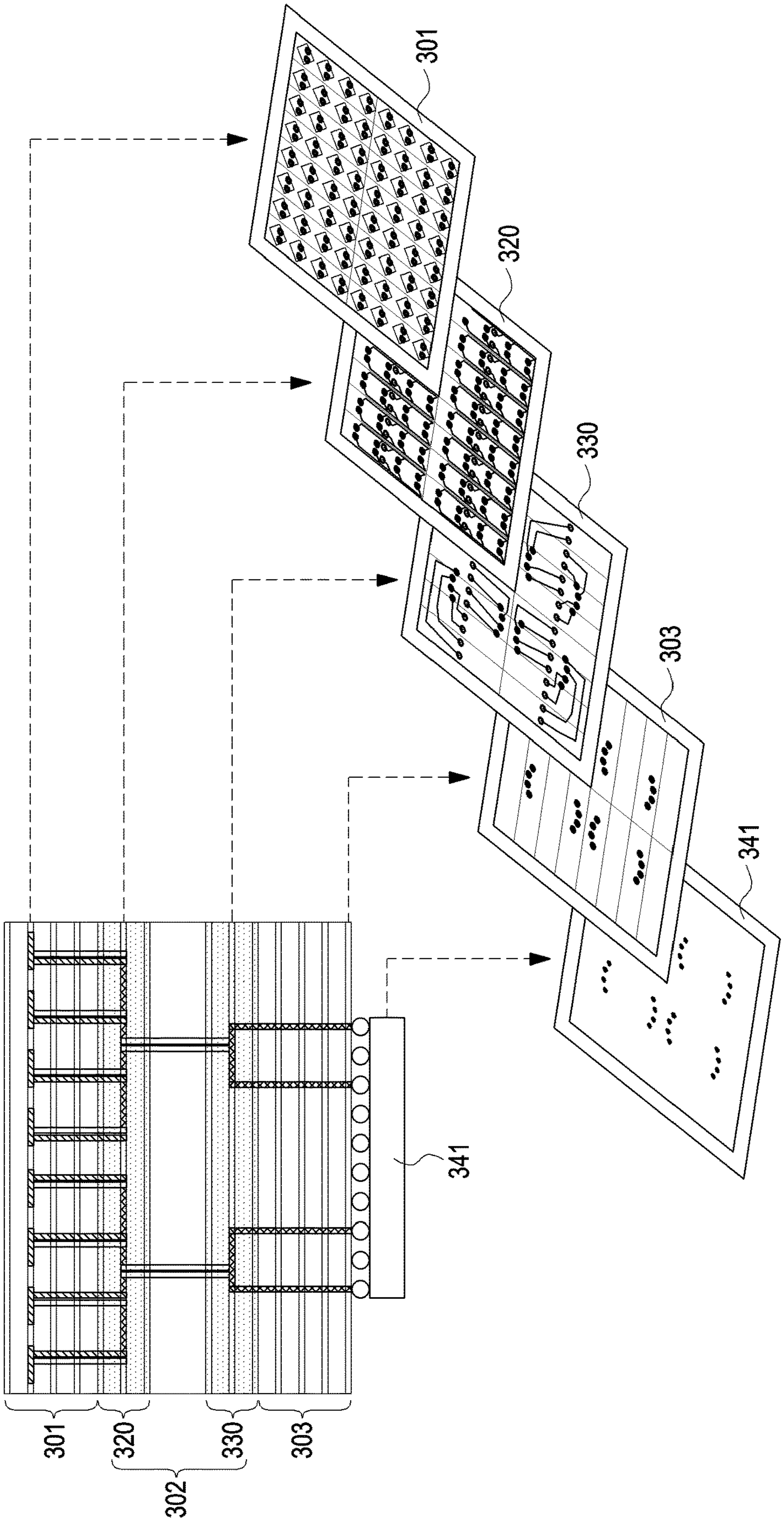
FIG. 6 is a cross-sectional view of an antenna module disposed in an electronic device and a schematic view of each layer according to one of various embodiments of the disclosure.

FIG. 5 is a cross-sectional view illustrating an antenna module disposed in an electronic device according to one of various embodiments of the disclosure. FIG. 6 is a cross-sectional view of an antenna module disposed in an electronic device and a schematic view of each layer according to one of various embodiments of the disclosure.

According to various embodiments, an electronic device (e.g., the electronic device 101 of FIGS. 1 to 4) may include an antenna module 300. The antenna module 300 may have an antenna in package structure applicable at an ultra-high frequency, and the antennas disposed in the antenna module 300 may form a sub-array (e.g., a sub-array structure). According to an embodiment, each group of layers constituting the antenna module 300 (hereinafter, referred to as the antenna unit 301, the network unit 302, and the communication circuit unit 303) is designed to be independent, so that space efficiency may be increased and line loss may be minimized by optimizing the internal structure of the module.

According to various embodiments, the antenna module 300 may include an antenna unit 301 in which the antenna elements 301*a* (e.g., conductive plates) form a designated array and are composed of a plurality of layers. In the antenna module 300, the network unit 302 and the communication circuit unit 303 may be stacked downward from the antenna unit 301. According to an embodiment, the network unit 302 may include a feeding network unit 320 and a routing unit 330. According to an embodiment, the communication circuit unit 303 may include a mounting unit 340 and a connector 350.

According to various embodiments, the antenna module 300 may be designed in a high density interconnect (HDI) PCB structure including a plurality of layers. For example, each of the antenna unit 301, the feeding network unit 320, the routing unit 330, and the communication circuit unit 303 may have a form in which a plurality of layers are stacked. According to the illustrated embodiment, the antenna module 300 is described as including a total of 14 layers but, without limitations thereto, the antenna module 300 may be changed in design to have various layers applicable at ultra-high frequencies.

According to various embodiments, the antenna unit 301 may be designed as a sub-array structure including a designated array (e.g., a sub-array) of the antenna elements 301*a*. The antenna elements 301*a*, which are antenna radiators, may include at least one of, e.g., a patch-type radiation conductor, a conductive plate shape having a dipole structure extending in one direction, or a slot-shaped structure. As another example, as the patch-type antenna elements 301*a* efficiently use the physical space of the antenna module 300 and provide a broadside radiation pattern, the patch-type antenna elements 301*a* may be advantageous for gain and beam steering.

Figure 7A:
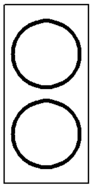
FIGS. 7A, 7B, 7C, and 7D are views illustrating a sub-array structure of antenna elements of an antenna module according to one of various embodiments of the disclosure.
Figure 7B:
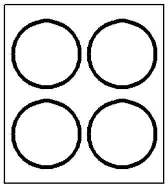
Figure 7C:
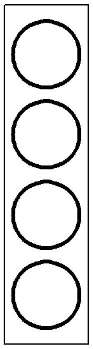
Figure 7D:
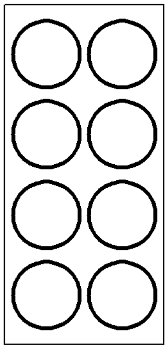

According to various embodiments, the antenna unit 301 may include a second layer 312, a third layer 313, and a fourth layer 314 from the first layer 311 including a surface exposed to the outside. The main radiators (e.g., the first antenna elements 312*a*) connected to the feeding line of the feeding network unit 320 are positioned on the second layer 312 and may be designed in a sub-array structure. However, the positions of the main radiators are not limited to the second layer 312, and according to an embodiment, the main radiators may be positioned on at least one of the first layer 311, the third layer 313, or the fourth layer 314. Since the number of radiators that may be disposed in the antenna module 300 is determined according to the used frequency band, the sub-array structure may be designed in various forms to correspond to the determined number of radiators. For example, the sub-array structure may be arranged in various forms such as m×n (e.g., 2×1, 2×2, 4×1, or 4×2) with respect to a patch type (see FIGS. 7A, 7B, and 7C). As another example, the shape of the patch type may be one of various shapes such as a square, a circle, a rectangle, or an ellipse. According to another embodiment, the arrangement and shape of the sub-array may be determined according to half power beamwidth (HPBW) and beam scan range requirements.

According to various embodiments, auxiliary radiators (e.g., the second antenna element 311*a*) may be disposed on the first layer 312 to correspond to the first antenna elements 312*a*. The second antenna elements 311*a* may be in the form of a patch type (or a dipole type or a slot type), and may serve as a radiator for obtaining additional antenna-related gain or for phase change (e.g., bandwidth increase). According to an embodiment, when the first antenna elements 312*a* are expressed as a top patch, the second antenna elements 311*a* may be expressed as a bottom patch or a coupling stacked patch. In still another embodiment, the characteristics of the second antenna elements 312*a* may vary depending on the patch shape, and may be expressed as a metasurface when the second antenna elements 312*a* are designed to have an artificial change rather than a general physical law, and the shape may be varied using an active element.

According to various embodiments, the third layer 313 may include a high impedance surface (HIS) structure 313*a*, and the fourth layer 314 may provide a ground surface 314*a*. The HIS structure 313*a* may be provided as a structure for reducing surface current between antennas by separating a ground layer under patch-type antenna elements to compensate for performance degradation occurring during beam steering. In general, the array of patch-type antenna elements may be degraded in performance when beam steering due to interference between adjacent antenna elements. Accordingly, a periodic ground plane may be disposed on a layer different from the layer on which the antenna elements are disposed, thereby limiting performance degradation during beam steering. According to an embodiment, since the wavelength of the antenna module 300 using the ultra-high frequency is very short, the HIS structure 313*a* may be designed inside the antenna module 300.

According to various embodiments, the network unit 302 may be positioned under the antenna unit 301 and may be formed of a plurality of layers. The network unit 302 may electrically connect a transmission signal and/or a reception signal transmitted from the communication circuit (e.g., RFIC) 341 to the antenna elements 301*a* of the antenna unit 301. According to an embodiment, the feeding network unit 320 adjacent to the antenna unit 301 and the routing unit 330 adjacent to the communication circuit unit 303 may be stacked in the network unit 302. Since the antenna module for the ultra-high frequency has an insufficient physical space, the degree of integration of the transmission line increases, and for the design accordingly, the network unit 302 may be designed to be divided into two stacked groups (each group is composed of a plurality of layers). For example, the functions are divided by using one group as the feeding network unit 320 and the other group as the routing unit 330, and an optimal path for maximum efficiency and minimum loss may be designed by identifying the spatial phase topology analyzed considering the positions (e.g., bump map) of the transmission signal provided from the communication circuit 341 and/or the reception transmission line and the feeding positions of the antenna elements forming the sub-array structure and optimizing the adjacency and connectivity between layers.

According to various embodiments, the feeding network unit 320 of the network unit 302 may be formed of a plurality of layers and may transfer the signal received from the communication circuit 341 to the antenna elements 301*a* (or the feeding line connected to the antenna elements 301*a*) of the antenna unit 301 by using the first transmission line 315 in the form of a power divider. When the same input power and phase value are provided to each of the antenna elements 301*a* forming the sub-array structure, performance may be maximized. To that end, the first transmission line 315 of the feeding network unit 320 may be designed in various forms. For example, the structure of the first transmission line 315 of the feeding network unit 320 may be designed in at least one of a corporate feeding type, a series feeding type, and a hybrid heeding type.

According to an embodiment, in the case of the corporate feeding type, the signal input to each of the antenna elements 301*a* may be provided in the same phase and the same strength. The corporate feeding type may be required to be designed in consideration of the space occupied by a two-stage branch structure and placement of the input signal near the center of the sub-array structure. According to another embodiment, the series feeding type may provide high space utilization due to its simple structure. The series feeding type considers that the input signal is disposed on one side of the sub-array structure, and may require a design in which the strength and phase between the antenna elements do not change. According to another embodiment, the hybrid heeding type has intermediate performance and structural constraints between the corporate feeding type and the series feeding type and may require a design considering the same. According to an embodiment, various design changes may be made to the transmission line structure of the feeding network unit 320 depending on connectivity to the communication circuit and process design parameters considering the array of antenna elements and the feed of the sub-array structure.

According to an embodiment, the first transmission line 315 of the feeding network unit 320 may form a strip-type transmission line in which it is divided from a first point P1 connected from the routing unit 330 to a plurality of second points P2 facing the respective positions of the plurality of first antenna elements. However, the form of the first transmission line 315 is not limited to the strip type, and may be changed in design to a form such as CPW, CPWG, waveguide, or SIW.

At least one of the first point P1 and the plurality of second points P2 of the first transmission line 315 may form the same transmission line. According to another embodiment, the first point P1 and the plurality of second points P2 of the first transmission line 315 may be disposed on the same layer or may be disposed on different layers.

According to an embodiment, the first transmission line 315 of the feeding network unit 320 may include a 1-1th transmission line 315*a* electrically connected to the Tx terminal of the communication circuit 341 and a 1-2th transmission line 315*b* electrically connected to the Rx terminal of the communication circuit 341. According to another embodiment, the 1-1th transmission line 315*a* and the 1-2th transmission line 315*b* may be disposed on the same layer or may be disposed on different layers. According to another embodiment, in the first transmission line 315 of the feeding network unit 320, the Tx terminal and the Rx terminal of the communication circuit 341 may be designed together in one line, and the Tx-Rx switch may be disposed in the communication circuit 341.

According to various embodiments, the routing unit 330 of the network unit 302 may be formed of a plurality of layers, and may electrically connect the output position of the communication circuit 341 to the input position of the feeding network unit 320. For example, the routing unit 330 may include a strip-type second transmission line 316 and a second via 318 to provide the signal provided from the communication circuit 341 to the feeding network unit 320 via the routing unit 330. However, the form of the second transmission line 316 is not limited to the strip type, and may be changed in design to a form such as CPW, CPWG, waveguide, or SIW.

According to an embodiment, the second transmission line 316 of the routing unit 330 may extend from the third point P3 connected from the first via 317 of the communication circuit unit 303 to the fourth point P4 facing the first point P1 of the feeding network unit 320 on one layer. According to an embodiment, the second via 318 of the routing unit 330 is a through via for flowing signals, and may be formed to pass through a core layer formed between the feeding network unit 320 and the routing unit 330. For example, the second via 318 of the routing unit 330 may connect the first point of the feeding network unit 320 to the fourth point of the routing unit 330.

According to an embodiment, the position of the communication circuit 341 positioned on the lower surface of the antenna module 300 and the positions of the antenna elements 301*a* of the sub-array structure positioned on the upper surface of the antenna module 300 may have fixed values, and the output position (e.g., the second point P2) of the first transmission line 315 of the feeding network unit 320 connected to the antenna elements 301*a* may also have a fixed value. As the feeding network unit 320 is formed as a transmission line in the form of a power divider, the routing unit 330 may be designed as an optimal path for connecting two points considering the input position (e.g., the first point P1) of the first transmission line 315 of the feeding network unit 320 and the output position (e.g., the position of the Tx terminal/Rx terminal of the communication circuit 341) of the communication circuit 341.

According to an embodiment, the connection point between the second transmission line 316 and the second via 318 in the routing unit 330 may be designed in a matching structure for matching. For example, the matching structure may be designed in a shape of at least one of an impedance transformer line, an open stub, or a short stub for transmission line matching. By designing the matching structure in the routing unit 330 that provides a space and function independent of the feeding network unit 320, it is possible to overcome the space constraints contained in the antenna module 300 for the ultra-high frequency band.

According to various embodiments, the communication circuit unit 303 may be positioned under the network unit 302 and may include a mounting unit 340 and a connector 350. According to an embodiment, the mounting unit 340 may be positioned under the routing unit 330 and may be formed of a plurality of layers. The mounting unit 340 may have the communication circuit 341 mounted on a lower surface thereof, and may be designed such that a transmission and/or reception output of the communication circuit 341 is connected to an input of the network unit 302. For example, the mounting unit 340 may include a plurality of first vias 317 such that a transmission and/or reception output of the communication circuit 341 is provided to the routing unit 330, and each of the plurality of first vias 317 may be designed to pass through a plurality of conductive layers (and dielectric layers). According to an embodiment, the mounting unit 340 may be provided with only a via (e.g., the first via 317) without a transmission line.

According to an embodiment, the mounting unit 340 may include an RF signal for transmitting and/or receiving an RF signal of the communication circuit 341, an input/output of an IF signal used in the communication circuit 341, an input/output of a logic circuit, a control signal, and power/ground lines. The thickness of the mounting unit 340 may be designed to correspond to the number of input/output signals of the communication circuit 341.

According to various embodiments, the connector 350 may be positioned under the mounting part 340 and may be formed of a plurality of layers. The connector 350 may include a ball grid array (BGA) 351 and a molding structure 352 to electrically connect a control, power, or IF signal provided from the communication circuit 341 and the communication circuit 341 to a main circuit board. According to an embodiment, the connector 350 may further include a connection structure between a copper block for heat dissipation of the antenna module 300 and the main circuit board.

Figure 8A:
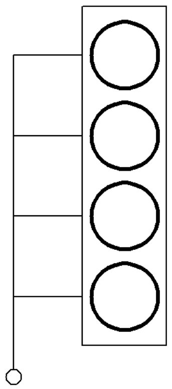
FIGS. 8A, 8B, and 8C are views schematically illustrating a feeding configuration for a sub-array structure of an antenna module according to another one of various embodiments of the disclosure.
Figure 8B:
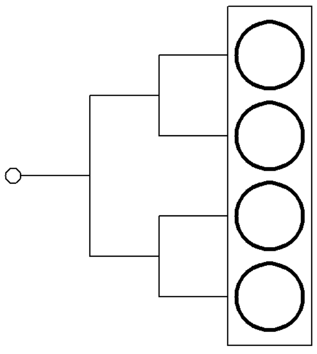
Figure 8C:
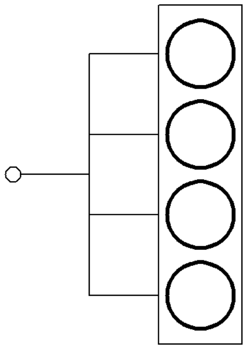

FIGS. 7A, 7B, 7C, and 7D are views illustrating a sub-array structure of antenna elements of an antenna module according to one of various embodiments of the disclosure. FIGS. 8A, 8B, and 8C are views schematically illustrating a feeding configuration for a sub-array structure of an antenna module according to another one of various embodiments of the disclosure.

According to various embodiments, an electronic device (e.g., the electronic device 101 of FIGS. 1 to 4) may include an antenna module (e.g., the antenna module 300 of FIGS. 5 and 6). The antenna module 300 may have an antenna in package structure applicable at an ultra-high frequency, and the antennas disposed in the antenna module 300 may form a sub-array. Each group of layers constituting the antenna module 300 is designed to be independent, so that space efficiency may be increased and line loss may be minimized by optimizing the internal structure of the module.

The sub-array structure of FIGS. 7A, 7B, 7C, and 7D and the feeding configuration of FIGS. 8A, 8B, and 8C may be identical in whole or part to the configuration of the sub-array structure of the antenna unit 301 and the feeding network unit 320 of FIGS. 5 and 6.

According to various embodiments, the antenna module 300 may include an antenna unit (e.g., the antenna unit 301 of FIGS. 5 and 6), and the antenna unit 301 may be designed in a sub-array structure in which antenna elements (e.g., conductive plates) forms a sub-array. Referring to FIGS. 7A, 7B, 7C, and 7D, each sub-array structure may be provided in an array such as 2×1, 2×2, 4×1, and 4×2 with respect to a patch type.

According to various embodiments, a feeding network unit (e.g., the feeding network unit 320 of FIGS. 5 and 6) stacked with the antenna unit 301 may provide an arrangement of signal transmission lines for maximizing the performance of each antenna formed in the sub-array structure (e.g., providing the same input power and the same phase value to each antenna).

Referring to FIG. 8A, when the sub-array antenna structure is 4×1, the signal provided from a communication circuit (e.g., the communication circuit 341 of FIGS. 5 and 6) is connected to an antenna element through a series feeding-type transmission line. An input end may be disposed on one side of the sub-array antenna structure, and four transmission lines divided from the input end may be connected to the antenna elements, respectively.

Referring to FIG. 8B, when the sub-array antenna structure is 4×1, the signal provided from the communication circuit 341 is connected to an antenna element through a corporate feeding-type transmission line. The input end may be disposed adjacent to the central area of the sub-array antenna structure, and there may be provided a two-stage branch structure in which each of two transmission lines divided from the input end forms two divided transmission lines. Each of the four divided transmission lines may be connected to an antenna element.

Referring to FIG. 8C, when the sub-array antenna structure is 4×1, the signal provided from the communication circuit 341 is connected to an antenna element through a hybrid feeding-type transmission line. An input end may be disposed adjacent to the central area of the sub-array antenna structure, and four transmission lines divided from the input end may be connected to the antenna elements, respectively. The description made above with reference to FIGS. 5 and 6 may apply to the features of the corporate feeding type, series feeding type, and hybrid feeding type.

Figure 9:
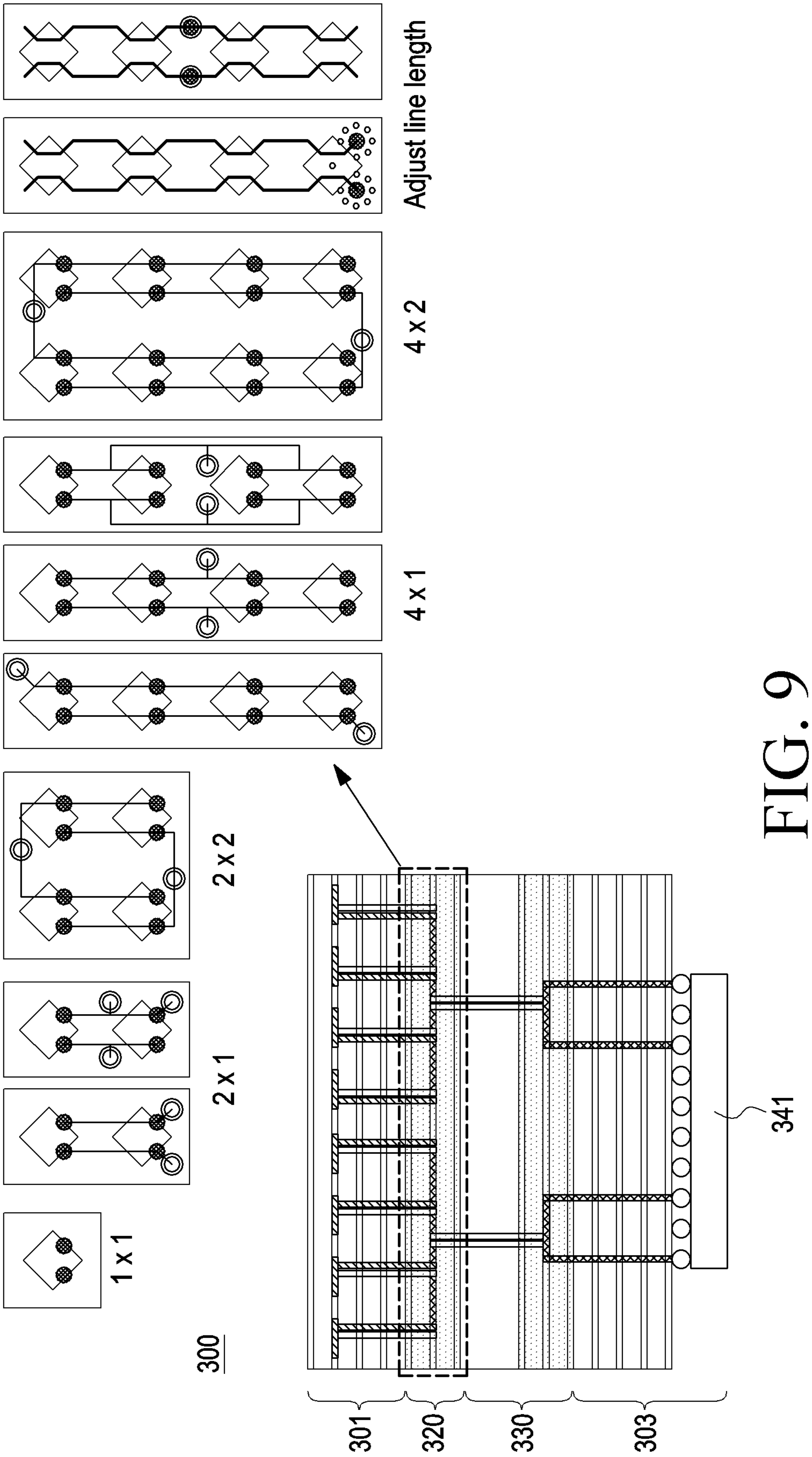
FIG. 9 is a view illustrating a feeding network structure in a feeding network unit connected to antenna elements of an antenna module according to one of various embodiments of the disclosure.

FIG. 9 is a view illustrating a feeding network structure in a feeding network unit connected to antenna elements of an antenna module according to one of various embodiments of the disclosure.

According to various embodiments, an electronic device (e.g., the electronic device 101 of FIGS. 1 to 4) may include an antenna module 300. The antenna module 300 may have an antenna in package structure applicable at an ultra-high frequency, and the antennas disposed in the antenna module 300 may form a sub-array. Each group of layers constituting the antenna module 300 is designed to be independent, so that space efficiency may be increased and line loss may be minimized by optimizing the internal structure of the module.

According to various embodiments, in the antenna module 300, the feeding network unit 320, the routing unit 330, and the communication circuit unit 303 may be sequentially stacked from the antenna unit 301 having the sub-array structure. Each of the antenna unit 301, the feeding network unit 320, the routing unit 330, and the communication circuit unit 303 may include a plurality of layers.

The sub-array structure and the feeding configuration of FIG. 9 may be identical in whole or part to the configuration of the sub-array structure and the feeding network unit 320 of the antenna unit 301 of FIGS. 5 and 6.

According to various embodiments, in order to provide signals from the communication circuit 341 to the antenna elements of the sub-array structure, the feeding network unit 320 may form various transmission line types corresponding to the sub-array structure. A case in which the transmission line type is designed on a single layer of the feeding network unit 320 is described. Each sub-array structure may be provided in an array such as 1×1, 2×1, 2×2, 4×1, and 4×2 with respect to a patch type.

According to the illustrated embodiment, two 2×1 sub-array structures are illustrated. For example, a transmission line branched from an input end positioned on one side of the sub-array structure to each antenna element is disclosed. Two transmission lines may be provided to be connected to a Tx terminal and an Rx terminal disposed for each antenna element. As another example, a transmission line branched from an input end positioned near the center of the sub-array structure (e.g., between antenna elements) to each antenna element is disclosed. Two transmission lines may be provided to be connected to a Tx terminal and an Rx terminal disposed for each antenna element.

According to the illustrated embodiment, one 2×2 sub-array structure is illustrated. For example, a transmission line branched from an input end positioned near the center of the sub-array structure (e.g., between antenna elements) to each antenna element is disclosed. Two transmission lines may be provided to be connected to a Tx terminal and an Rx terminal disposed for each antenna element.

According to the illustrated embodiment, three 4×1 sub-array structures are illustrated. For example, a transmission line branched from an input end positioned on one side of the sub-array structure to each antenna element is disclosed. Two transmission lines may be provided to be connected to a Tx terminal and an Rx terminal disposed for each antenna element. As another example, a transmission line branched from an input end positioned near the center of the sub-array structure (e.g., between antenna elements) to each antenna element is disclosed. Two transmission lines may be provided to be connected to a Tx terminal and an Rx terminal disposed for each antenna element. As another example, a transmission line branched in two stages from an input end positioned near the center of the sub-array structure (e.g., between the antenna elements) may be connected to each antenna element. Two transmission lines may be provided to be connected to a Tx terminal and an Rx terminal disposed for each antenna element.

According to the illustrated embodiment, one 4×2 sub-array structure is illustrated. For example, a transmission line branched from an input end positioned on one side of the sub-array structure to each antenna element is disclosed. Two transmission lines may be provided to be connected to a Tx terminal and an Rx terminal disposed for each antenna element.

According to the illustrated embodiment, as transmission lines are designed in various shapes in a 4×1 sub-array structure, a shape for adjusting the length of a transmission line is disclosed. However, the type of the sub-array structure and the arrangement configuration of the transmission lines are not limited to the illustrated embodiment, and in order to enhance antenna performance, various design changes may be made in consideration of the number and arrangement relationship of the antenna elements of the sub-array structure and the area of the feeding network layer.

Figure 10:
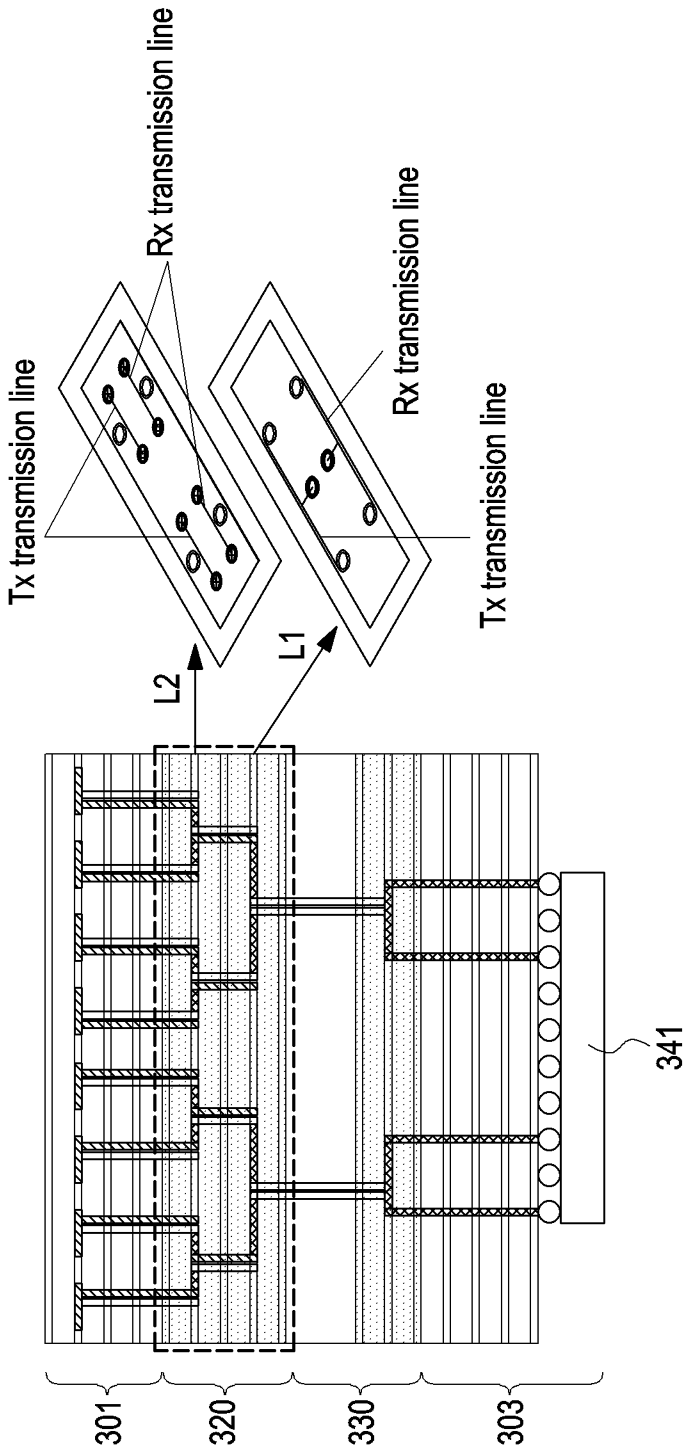
FIG. 10 is a view illustrating a transmission line structure in a feeding network unit connected to antenna elements of an antenna module according to another one of various embodiments of the disclosure.
Figure 11:
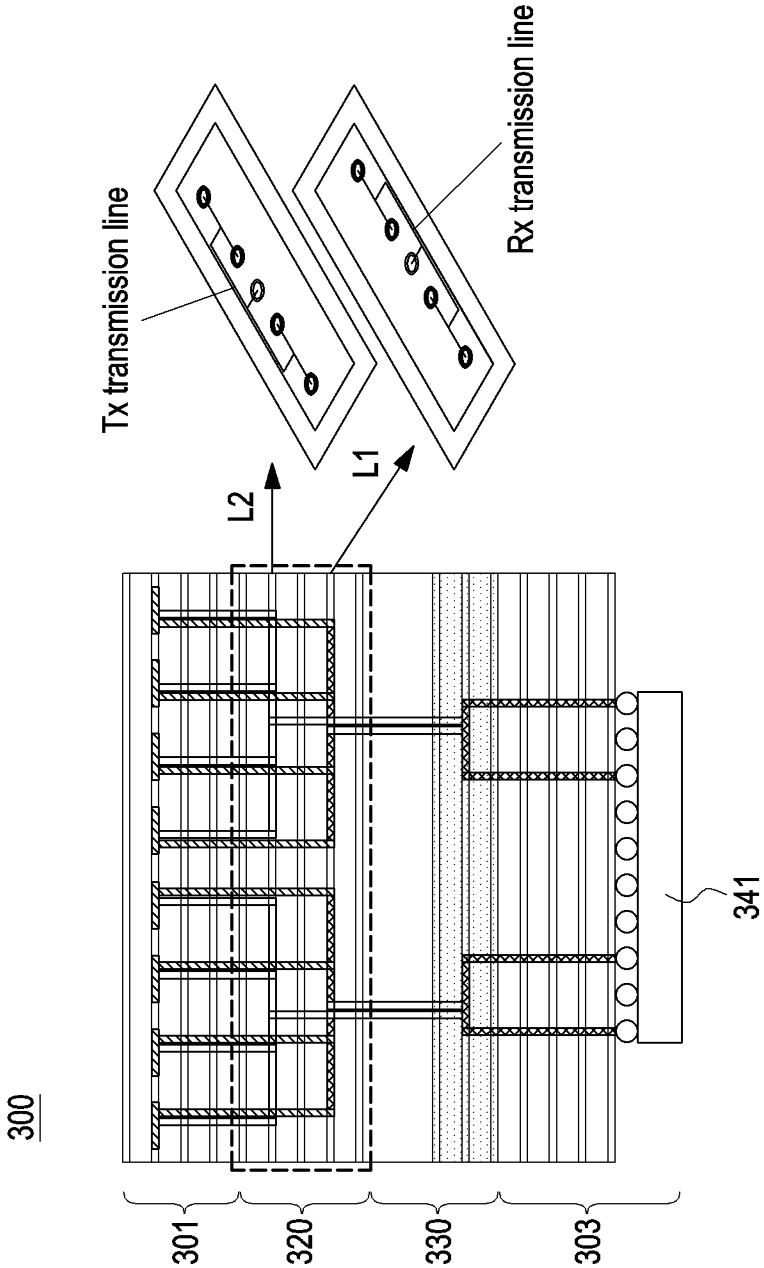
FIG. 11 is a view illustrating a transmission line structure in a feeding network unit connected to antenna elements of an antenna module according to another one of various embodiments of the disclosure.

FIG. 10 is a view illustrating a transmission line structure in a feeding network unit connected to antenna elements of an antenna module according to one of various embodiments of the disclosure. FIG. 11 is a view illustrating a transmission line structure in a feeding network unit connected to antenna elements of an antenna module according to another one of various embodiments of the disclosure.

According to various embodiments, an electronic device (e.g., the electronic device 101 of FIGS. 1 to 4) may include an antenna module 300. The antenna module 300 may have an antenna in package structure applicable at an ultra-high frequency, and the antennas disposed in the antenna module 300 may form a sub-array.

According to various embodiments, in the antenna module 300, the feeding network unit 320, the routing unit 330, and the communication circuit unit 303 may be sequentially stacked from the antenna unit 301 having the sub-array structure. Each of the antenna unit 301, the feeding network unit 320, the routing unit 330, and the communication circuit unit 303 may include a plurality of layers. According to various embodiments, in order to provide signals from the communication circuit 341 to the antenna elements of the sub-array structure, the feeding network unit 320 may form various transmission line types corresponding to the sub-array structure.

The sub-array structure and the feeding configuration of FIGS. 10 and 11 may be identical in whole or part to the configuration of the sub-array structure and the feeding network unit 320 of the antenna unit 301 of FIGS. 5 and 6.

According to an embodiment, referring to FIG. 10, in order to electrically transfer Tx signals transferred from the communication circuit 341 to the antenna elements with respect to the 4×1 sub-array structure, transmission lines may be designed to extend on a plurality of layers of the feeding network unit 320. Two transmission lines may be primarily branched on the first layer L1. Each of the two branched transmission lines may be branched into two again on the second layer L2 disposed on the first layer L1.

According to another embodiment, in order to electrically transfer Rx signals transferred from the communication circuit 341 to the antenna elements with respect to the 4×1 sub-array structure, transmission lines may be designed to extend on a plurality of layers of the feeding network unit 320. Two transmission lines may be primarily branched on the first layer L1. Each of the two branched transmission lines may be branched into two again on the second layer L2 stacked on the first layer L1.

According to an embodiment, another separate layer may be disposed between the first layer L1 and the second layer L2. According to an embodiment, at least one via may be formed to connect the transmission line formed on the first layer L1 and the transmission line formed on the second layer L2.

According to an embodiment, referring to FIG. 11, in order to electrically transfer Tx/Rx signals transferred from the communication circuit 341 to the antenna elements with respect to the 4×1 sub-array structure, transmission lines may be designed to extend on a plurality of layers of the feeding network unit 320. As compared to FIG. 10, the Rx signal may be provided to each of the antenna elements forming a 4×1 sub-array structure after passing through a branched strip-type transmission line formed on the first layer L1. The Tx signal may be provided to each of the antenna elements forming a 4×1 sub-array structure after passing through a branched strip-type transmission line formed on the second layer L2 disposed on the first layer L1. However, without limitations to the structure in which the transmission line for the Rx signal is disposed on the first layer L1 and the transmission line for the Tx signal is disposed on the second layer L2, various design changes may be made, such as the transmission line for the Rx signal being disposed on the second layer L2, the transmission line for the Tx signal being disposed on the first layer L1, or transmission lines are divided and disposed on three or more layers.

Figure 12A:
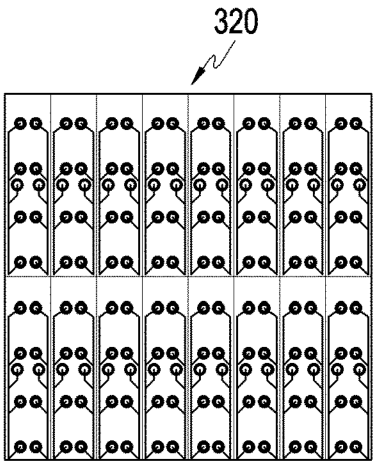
FIGS. 12A, 12B, and 12C are views illustrating a transmission line network structure in a feeding network unit to be connected to antenna elements of an antenna module according to one of various embodiments of the disclosure.
Figure 12B:
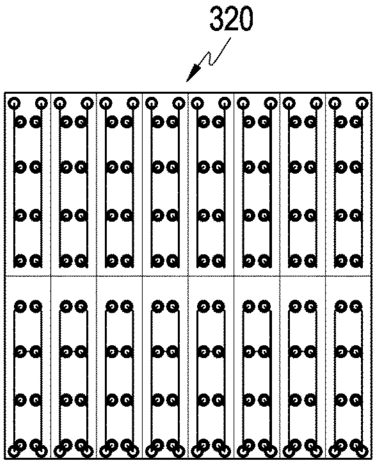
Figure 12C:
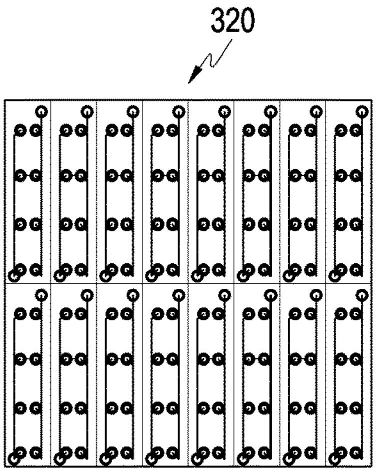

FIGS. 12A, 12B, and 12C are views illustrating a transmission line network structure in a feeding network unit to be connected to antenna elements of an antenna module according to one of various embodiments of the disclosure.

According to various embodiments, an electronic device (e.g., the electronic device 101 of FIGS. 1 to 4) may include an antenna module (e.g., the antenna module 300 of FIGS. 5 and 6). The antenna module 300 may have an antenna in package structure applicable at an ultra-high frequency, and the antennas disposed in the antenna module 300 may form a sub-array.

According to various embodiments, in order to provide signals from the communication circuit (e.g., the communication circuit 341 of FIGS. 5 and 6) to the antenna elements of the sub-array structure, the feeding network unit 320 may form various transmission line types corresponding to the sub-array structure.

According to the illustrated embodiment, one sub-array structure of the antenna module 300 may be formed in a 4×1 array with respect to a patch type, and a total of 16 sub-array structures may be disposed in an 8×2 array on one surface (e.g., an upper surface) of the antenna module 300. According to an embodiment, one layer of the feeding network unit 320 may include an input end and an output end capable of transmitting and/or receiving a Tx signal, and may include an input end and an output end capable of transmitting and/or receiving an Rx signal. FIG. 12A illustrates a single layer in which a hybrid feeding type is designed, and FIGS. 12B and 12C illustrate a single layer in which a series feeding type is designed. The above-described details may apply to the details of each layer.

Figure 13A:
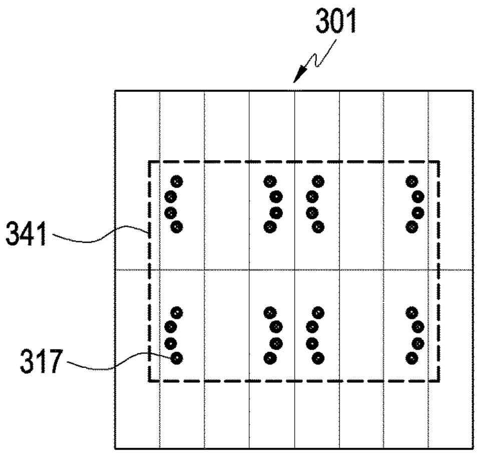
FIGS. 13A, 13B, and 13C illustrate a structure of a via and transmission lines designed on each layer of an antenna module according to one of various embodiments of the disclosure.
Figure 13B:
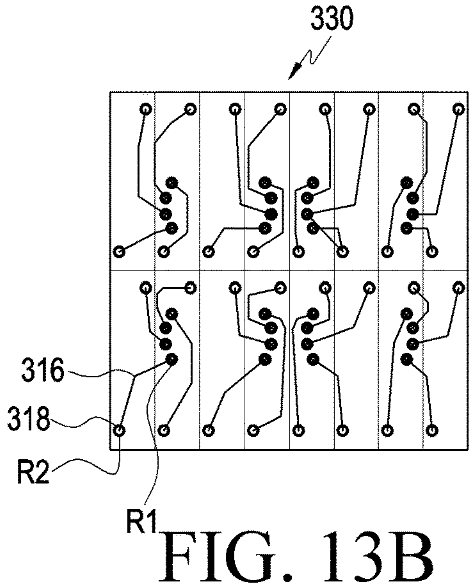
Figure 13C:
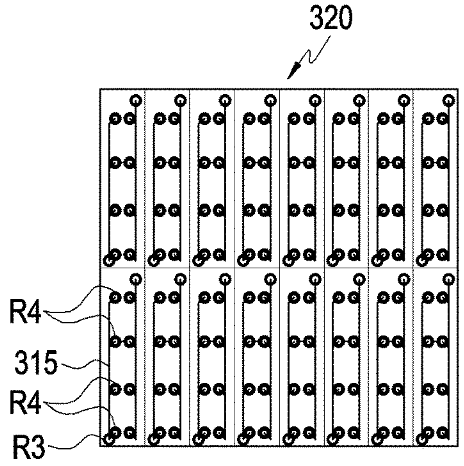

FIGS. 13A, 13B, and 13C illustrate a structure of a via and transmission lines designed on each layer of an antenna module according to one of various embodiments of the disclosure.

According to various embodiments, an electronic device (e.g., the electronic device 101 of FIGS. 1 to 4) may include an antenna module (e.g., the antenna module 300 of FIGS. 5 and 6). The antenna module 300 may have an antenna in package structure applicable at an ultra-high frequency, and the antennas disposed in the antenna module 300 may form a sub-array.

According to various embodiments, in the antenna module 300, the feeding network unit 320, the routing unit 330, and the communication circuit unit 303 may be sequentially stacked from the antenna unit (e.g., the antenna unit 301 of FIGS. 5 and 6) having the sub-array structure. According to an embodiment, in order to provide signals from the communication circuit 341 to the antenna elements of the sub-array structure, the communication circuit unit 303, routing unit 330, and feeding network unit 320 may form various transmission line types corresponding to the sub-array structure.

The configuration of the transmission line of FIGS. 13A, 13B, and 13C may be identical in whole or part to the configuration of the transmission line of the antenna module 300 of FIGS. 5 and 6.

Referring to FIG. 13A, in the communication circuit unit 303, first vias 317 corresponding to output positions (e.g., Tx/Rx output ends) of the communication circuit 341 may be designed. As the size of the communication circuit 341 is fixed, and is disposed in the central area of the communication circuit unit 303, the first vias 317 may be designed near the central area of the communication circuit unit 303.

Referring to FIG. 13B, in the routing unit 330, a first point R1 extending from one first via 317 corresponding to the output position of the communication circuit 341 and a second point R2 may be designed at a position corresponding to the input position of the feeding network unit 320, and the first point R1 and the second point R2 may be connected through a strip-type first transmission line 315. The second point R2 may be electrically connected to the third point R3 of the feeding network unit 320 through the second via 318. According to an embodiment, the first point R1, the second point R2, and the second transmission line 316 connecting the first point R1 and the second point R2 may be individually designed by the number corresponding to the output ends of the communication circuit 341.

According to an embodiment, the position of the input end of the feeding network unit 320 may be fixed depending on the arrangement of the antenna elements of the sub-array structure and the position of the output end of the communication circuit 341. Accordingly, in the form of the second transmission lines 316 of the routing unit 330, the path between the fixed input end and the output end may be variously designed to be advantageous for antenna performance. For example, in the routing unit 330, when the first point R1 (e.g., a positional configuration corresponding to the output end of the communication circuit 341) is positioned in the center and the second points (e.g., a positional configuration corresponding to the input end of the feeding network unit 320) are disposed at two opposite ends with respect to one sub-array structure (e.g., the Tx output end is disposed at one end/the Rx output end is disposed at the other end), the second transmission lines 316 may be formed in a radial form extending from the center toward the edge.

Referring to FIG. 13C, the feeding network unit 320 may include a third point R3 connected to the second point R2 through one of the second vias 318, and a fourth point R4 disposed to face the antenna element of the sub-array structure. In the feeding network unit 320, the third point R3 and the fourth point R4 may be connected through the strip-type first transmission line 315, and the single transmission line extending from the third point R3 may be branched according to the number of antenna elements corresponding to the sub-array structure. For example, with respect to one sub-array structure, the third points (e.g., Tx/Rx input end) R3 may be disposed at two opposite ends, and the first transmission lines 315, respectively, may extend from the third point R3 toward an area facing the positions where four antenna elements are disposed. The fourth point R4 may be electrically connected to the input ends of the antenna elements through vias. According to an embodiment, the third point R3, the fourth point R4, and the first transmission line 315 connecting the third point R3 and the fourth point R4 may be individually designed by the number corresponding to the output ends of the communication circuit 341.

Figure 14A:
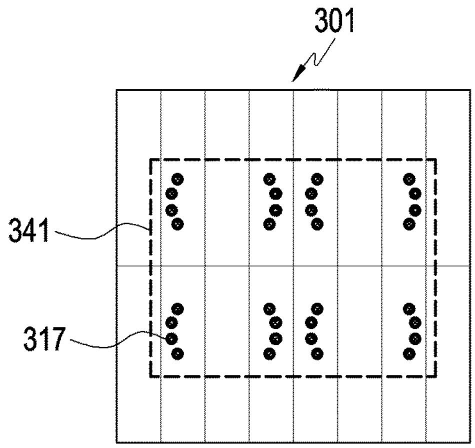
FIGS. 14A, 14B, and 14C illustrate a structure of a via and transmission lines designed on each layer of an antenna module according to another one of various embodiments of the disclosure.
Figure 14B:
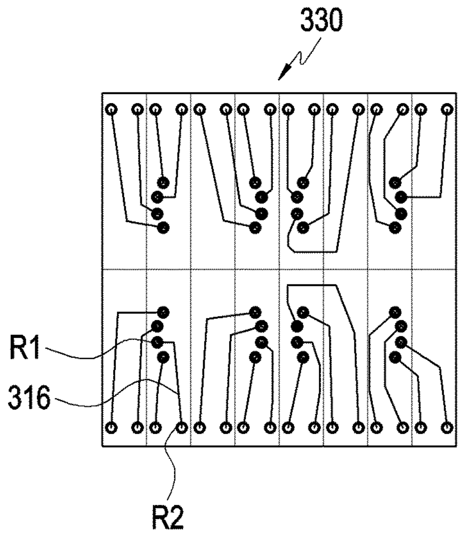
Figure 14C:
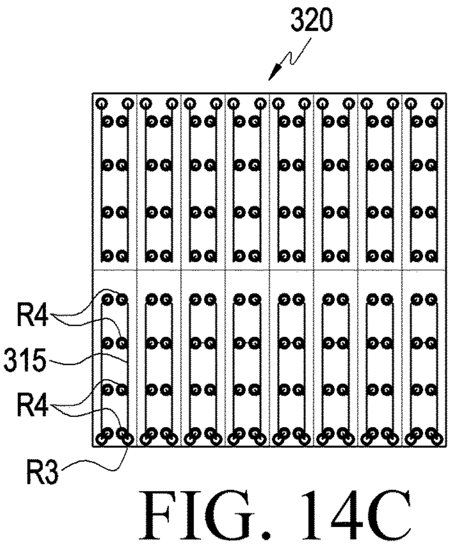

FIGS. 14A, 14B, and 14C illustrate a structure of a via and transmission lines designed on each layer of an antenna module according to another one of various embodiments of the disclosure.

According to various embodiments, an electronic device (e.g., the electronic device 101 of FIGS. 1 to 4) may include an antenna module 300. The antenna module 300 may have an antenna in package structure applicable at an ultra-high frequency, and the antennas disposed in the antenna module 300 may form a sub-array.

The structure of the feeding network unit 320, the routing unit 330, and the communication circuit unit 303 of FIGS. 14A, 14B, and 14C may be identical in whole or part to the structure of the feeding network unit 320, the routing unit 330, and the communication circuit unit 303 of FIGS. 13A, 13B, and 13C. The following description focuses primarily on the differences.

Referring to FIG. 14A, in the communication circuit unit 303, first vias 317 corresponding to output positions (e.g., Tx/Rx output ends) of the communication circuit 341 may be designed. As the size of the communication circuit 341 is fixed, and is disposed in the central area of the communication circuit unit 303, the first vias 317 may be designed near the central area of the communication circuit unit 303.

Referring to FIG. 14B, in the routing unit 330, a first point R1 extending from one first via 317 corresponding to the output position of the communication circuit 341 and a second point R2 may be designed at a position corresponding to the input position of the feeding network unit 320, and the first point R1 and the second point R2 may be connected through a strip-type second transmission line 316.

According to an embodiment, in the routing unit 330, when the first point R1 (e.g., a positional configuration corresponding to the output end of the communication circuit 341) is positioned in the center and the second points (e.g., a positional configuration corresponding to the input end of the feeding network unit 320) are disposed at one end with respect to one sub-array structure (e.g., the Tx output end/Rx output end are disposed side by side at one end), the second transmission lines 316 may be formed to extend from the center to the edge.

Referring to FIG. 14C, the feeding network unit 320 may include a third point R3 connected to the second point R2, and a fourth point R4 disposed to face the antenna element of the sub-array structure. In the feeding network unit 320, the third point R3 and the fourth point R4 may be connected through the strip-type first transmission line 315, and the single transmission line extending from the third point R3 may be branched according to the number of antenna elements corresponding to the sub-array structure. For example, with respect to one sub-array structure, the third points (e.g., Tx/Rx input end) R3 may be disposed at one end, and the first transmission lines 315, respectively, may extend from the third point R3 toward an area facing the positions where four antenna elements are disposed.

Figure 15A:
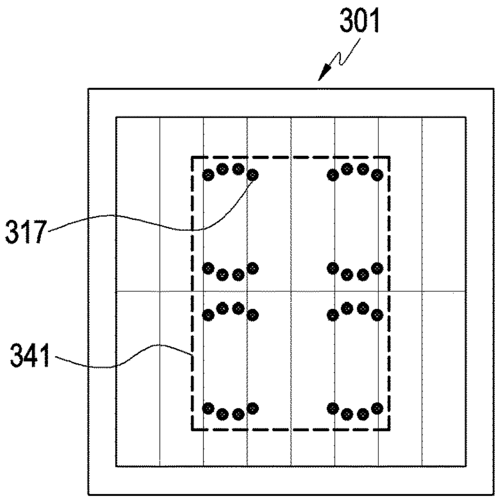
FIGS. 15A, 15B, and 15C illustrate a structure of a via and transmission lines designed on each layer of an antenna module according to another one of various embodiments of the disclosure.
Figure 15B:
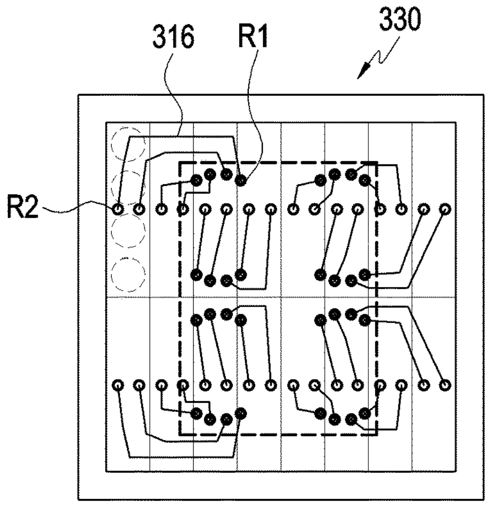
Figure 15C:
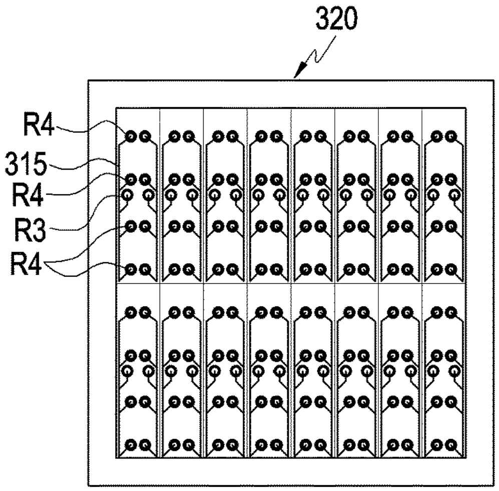

FIGS. 15A, 15B, and 15C illustrate a structure of a via and transmission lines designed on each layer of an antenna module according to another one of various embodiments of the disclosure.

According to various embodiments, an electronic device (e.g., the electronic device 101 of FIGS. 1 to 4) may include an antenna module 300. The antenna module 300 may have an antenna in package structure applicable at an ultra-high frequency, and the antennas disposed in the antenna module 300 may form a sub-array.

The structure of the feeding network unit 320, the routing unit 330, and the communication circuit unit 303 of FIGS. 15A, 15B, and 15C may be identical in whole or part to the structure of the feeding network unit 320, the routing unit 330, and the communication circuit unit 303 of FIGS. 13A, 13B, and 13C. The following description focuses primarily on the differences.

Referring to FIG. 15A, in the communication circuit unit 303, first vias 317 corresponding to output positions (e.g., Tx/Rx output ends) of the communication circuit 341 may be designed. As the size of the communication circuit 341 is fixed, and is disposed in the central area of the communication circuit unit 303, the first vias 317 may be designed near the central area of the communication circuit unit 303. As compared to FIGS. 13A and 14A, the communication circuit 341 of FIG. 15A is rotated by 90 degrees, and the position of the output end may also be rotated by 90 degrees.

Referring to FIG. 15B, in the routing unit 330, a first point R1 extending from one first via 317 corresponding to the output position of the communication circuit 341 and a second point R2 may be designed at a position corresponding to the input position of the feeding network unit 320, and the first point R1 and the second point R2 may be connected through a strip-type second transmission line 316.

According to an embodiment, in the routing unit 330, when the first point R1 (e.g., a positional configuration corresponding to the output end of the communication circuit 341) is positioned in the center and the second points (e.g., a positional configuration corresponding to the input end of the feeding network unit 320) may be disposed in the central area with respect to one sub-array structure (e.g., the Tx output end/Rx output end are disposed side by side at one end).

Referring to FIG. 15C, the feeding network unit 320 may include a third point R3 connected to the second point R2, and a fourth point R4 disposed to face the antenna element of the sub-array structure. In the feeding network unit 320, the third point R3 and the fourth point R4 may be connected through the strip-type first transmission line 315, and the single transmission line extending from the third point R3 may be branched according to the number of antenna elements corresponding to the sub-array structure. For example, with respect to one sub-array structure, the third points (e.g., Tx/Rx input end) R3 may be disposed in the central area, and the first transmission lines 315, respectively, may extend from the third point R3 toward an area facing the positions where four antenna elements are disposed.

FIG. 16 is a view schematically illustrating a stacked structure of an antenna module according to various embodiments of the disclosure.

According to various embodiments, an electronic device (e.g., the electronic device 101 of FIGS. 1 to 4) may include an antenna module 300. The antenna module 300 may have an antenna in package structure applicable at an ultra-high frequency, and the antennas disposed in the antenna module 300 may form a sub-array.

According to various embodiments, in the antenna module 300, the feeding network unit 320, the routing unit 330, and the communication circuit unit 303 may be sequentially stacked from the antenna unit 301 having the sub-array structure. Each of the antenna unit 301, the feeding network unit 320, the routing unit 330, and the communication circuit unit 303 may include a plurality of layers.

According to various embodiments, PPG and Cu layers may be alternately disposed in each layer, and the thickness of the PPG may be about 35 to 45 um, and the thickness of the Cu layer may be about 12 to 18 um. As another example, the thickness of the PPG may be about 40 um, and the thickness of the Cu layer may be about 15 um. According to an embodiment, the thickness of the core layer supporting the antenna module may be about 120 to 180 um. As another example, when the thickness of the core layer is assumed to be about 150 um, the total thickness of the antenna module may be about 870 um.

According to various embodiments, the antenna unit 301 may be formed of four layers, the feeding network unit 320 may be formed of three layers, the routing unit 330 may be formed of three layers, and the communication circuit unit 303 may be formed of four layers, so that the antenna module may exhibit a high density interconnect (HDI) structure of a total of 14 layers. However, the illustrated embodiment is one example, and the core layer may be excluded by the designer, or the feeding network unit and the routing unit may be reduced to five layers. As another example, the feeding network unit may be formed of five layers, rather than three layers and, as such, a design change may be made to have various stack structures to enhance antenna performance.

According to an embodiment, e.g., the antenna unit 301 may be stacked in a total of four layers, antenna elements may be disposed in the first layer exposed to the outside and the second layer positioned below the first layer, and a dummy HIS structure may be formed in the third layer and the fourth layer. The feeding network unit 320 may be stacked in a total of three layers, and the sixth layer positioned in the middle may be designed with various types of feeding network structures. The fifth layer and the seventh layer stacked above and below the sixth layer may provide a ground surface. The routing unit 330 may be stacked in three layers, and the ninth layer positioned in the middle may be designed with various types of transmission line structures. The eighth layer and the tenth layer stacked above and below the ninth layer may provide a ground surface. A core layer may be positioned between the feeding network unit 320 and the routing unit 330. The core layer is a substrate capable of supporting the antenna module 300 as a whole, and may be positioned between the feeding network unit 320 and the routing unit 330. The communication circuit unit 303 may be stacked in four layers. The communication circuit may be disposed in the 11th layer, the 12th layer, and the 13th layer, and the 14th layer positioned thereunder may provide a ground surface.

According to various embodiments of the disclosure, an antenna module (e.g., the antenna module 300 of FIGS. 5 and 6) may comprise a communication circuit (e.g., the communication circuit 341 of FIG. 5) and an antenna unit (e.g., the antenna unit 301 of FIG. 5) including a plurality of first antenna elements forming a sub-array, a feeding network unit (e.g., the feeding network unit 320 of FIG. 5) disposed below the antenna unit and configured to provide at least one first transmission line branched to positions of the plurality of first antenna elements so that the plurality of first antenna elements (e.g., the antenna elements 301*a* of FIG. 5A) form the same phase, a mounting unit (e.g., the mounting unit 340 of FIG. 5) disposed under the feeding network unit and including a plurality of vias to provide transmission and/or reception outputs of the communication circuit to the antenna unit, and a routing unit (e.g., the routing unit 330 of FIG. 5) disposed between the feeding network unit and the communication circuit unit and configured to provide at least one second transmission line (e.g., the second transmission line 316 of FIG. 5) extending from a position corresponding to an output end of the communication circuit to a position corresponding to an input end of the feeding network unit on at least one layer.

According to various embodiments, the feeding network unit may include a stack of a plurality of layers and includes the first transmission line of a strip type branched from a first point (e.g., the first point P1 of FIG. 5) connected from the routing unit to a plurality of second points (e.g., the second point P2 of FIG. 5) facing respective positions of the plurality of first antenna elements.

According to various embodiments, the first transmission line connecting the first point and at least one of the plurality of second points may extend through one branch point.

According to various embodiments, the first transmission line connecting the first point and at least one of the plurality of second points may extend through a plurality of branch points.

According to various embodiments, the first point and the plurality of second points may be disposed on one layer.

According to various embodiments, the first point and the plurality of second points may be disposed on different layers.

According to various embodiments, the first transmission line of the feeding network unit may include a 1-1th transmission line (e.g., the 1-1th transmission line 315*a* of FIG. 5) electrically connected to a Tx terminal of the communication circuit and a 1-2th transmission line (e.g., the 1-2th transmission line 315*b* of FIG. 5) electrically connected to an Rx terminal of the communication circuit.

According to various embodiments, the 1-1th transmission line and the 1-2th transmission line may be positioned on different layers.

According to various embodiments, the routing unit may include a stack of a plurality of layers and may include the second transmission line (e.g., the second transmission line 316 of FIG. 5) of a strip type and a transmission via (e.g., the second via 318 of FIG. 5) to provide a signal provided from the communication circuit through the routing unit to the feeding network unit.

According to various embodiments, a connection point of the second transmission line of the strip type and the transmission via in the routing unit may form a matching structure for line matching.

According to various embodiments, the routing unit may include a stack of a plurality of layers and may include the second transmission line of a strip type extending from a third point (e.g., the third point P3 of FIG. 5) connected from the communication circuit unit to a fourth point (e.g., the fourth point P4 of FIG. 5) facing the first point of the feeding network unit on one layer.

According to various embodiments, the routing unit may further include a via formed through a plurality of layers to connect the first point and the fourth point.

According to various embodiments, the antenna module may further comprise a connector (e.g., the connector 350 of FIG. 5) positioned under the mounting unit and including a ball grid array (BGA) (e.g., the BGA 351 of FIG. 5) and a molding structure (e.g., the molding structure 352 of FIG. 5) to electrically connect the communication circuit and a control, power, or IF signal provided from the communication circuit to a main circuit board of the electronic device.

According to various embodiments, the antenna unit may include a stack of a plurality of layers, wherein the plurality of first antenna elements include a patch-type or slot-type radiator.

According to various embodiments, a sub-array structure forming the plurality of first antenna elements may have a plurality of groups arranged side by side on at least one layer of the antenna unit, one of the groups having an m×n array (wherein m and n are integers) with respect to a patch type.

According to various embodiments, the antenna unit may include a stack of a plurality of layers, wherein the plurality of first antenna elements include a patch-type or slot-type radiator. The plurality of first antenna elements may be arranged on an arbitrary layer among the plurality of layers, and a plurality of second antenna elements for increasing a bandwidth may be arranged in parallel to the plurality of first antenna elements on a layer disposed adjacent to the arbitrary layer.

According to various embodiments of the disclosure, an antenna module (e.g., the antenna module 300 of FIGS. 5 and 6) may comprise a communication circuit unit (e.g., the communication circuit unit 341) where a communication circuit is disposed and including at least one first via passing through a plurality of layers to transfer an output signal of the communication circuit, an antenna unit (e.g., the antenna unit 301 of FIG. 5) disposed on the communication circuit unit and including a plurality of antenna elements forming a sub-array, a feeding network unit (e.g., the feeding network unit 320 of FIG. 5) disposed between the antenna unit and the communication circuit unit and having at least one first transmission line, branched to positions of the plurality of antenna elements, disposed on at least one layer, and a routing unit (e.g., the routing unit 330 of FIG. 5) disposed between the feeding network unit and the communication circuit unit and including at least one second transmission line and at least one second via to transfer a signal provided from the at least one first via to the feeding network unit.

According to various embodiments, the feeding network unit may include a stack of a plurality of layers, and the at least one first transmission line may be formed of a strip-type transmission line branched from a first point connected from the routing unit to a plurality of second points facing respective positions of the plurality of first antenna elements.

According to various embodiments, the routing unit may include a stack of a plurality of layers, and the at least one second transmission line may be formed of a strip-type transmission line extending from a third point connected from the communication circuit unit to a fourth point facing the first point of the feeding network unit on one layer.

According to various embodiments, the routing unit may include a stack of a plurality of layers, and the at least one second via may be formed through the plurality of layers to connect the first point and the fourth point.

It is apparent to one of ordinary skill in the art that the antenna module and the electronic device including the same according to various embodiments of the disclosure as described above are not limited to the above-described embodiments and those shown in the drawings, and various changes, modifications, or alterations may be made thereto without departing from the scope of the disclosure.

The invention claimed is:

1. An antenna module, comprising:
- a communication circuit unit including a communication circuit;
- an antenna unit including a plurality of first antenna elements forming a sub-array;
- a network unit, the network unit and the communication circuit unit being stacked downward from the antenna unit;
- a feeding network unit disposed below the antenna unit and configured to provide at least one first transmission line branched to positions of the plurality of first antenna elements, at least a portion of the at least one first transmission line being extended to the antenna unit, in order that the plurality of first antenna elements form the same phase;
- a mounting unit disposed under the feeding network unit and including a plurality of vias to provide transmission and/or reception outputs of the communication circuit to a routing unit; and
- the routing unit disposed between the feeding network unit and the communication circuit unit and configured to provide at least one second transmission line, at least a portion of the at least one second transmission line extending from a position corresponding to an output end of the communication circuit to a position corresponding to an input end of the feeding network unit on at least one layer in a direction facing the feeding network unit,
- wherein the feeding network unit adjacent to the antenna unit and the routing unit adjacent to the communication circuit unit are stacked in the network unit.

2. The antenna module of claim 1, wherein the feeding network unit includes a stack of a plurality of layers, wherein the first transmission line is of a strip type, and wherein the first transmission line is branched from a first point connected from the routing unit to a plurality of second points facing respective positions of the plurality of first antenna elements.

3. The antenna module of claim 2, wherein the first transmission line connecting the first point and at least one of the plurality of second points extends through one branch point.

4. The antenna module of claim 2, wherein the first transmission line connecting the first point and at least one of the plurality of second points extends through a plurality of branch points.

5. The antenna module of claim 2, wherein the first point and the plurality of second points are disposed on one layer.

6. The antenna module of claim 2, wherein the first transmission line of the feeding network unit includes a transmission line electrically connected to a Tx terminal of the communication circuit and another transmission line electrically connected to an Rx terminal of the communication circuit.

7. The antenna module of claim 6, wherein the transmission line and the another transmission line are positioned on different layers.

8. The antenna module of claim 1, wherein the routing unit includes a stack of a plurality of layers and includes the second transmission line of a strip type and a transmission via to provide a signal provided from the communication circuit through the routing unit to the feeding network unit.

9. The antenna module of claim 8, wherein a connection point of the second transmission line of the strip type and the transmission via in the routing unit forms a matching structure for line matching.

10. The antenna module of claim 2, wherein the routing unit includes a stack of a plurality of layers and includes the second transmission line of a strip type extending from a third point connected from the communication circuit unit to a fourth point facing the first point of the feeding network unit on one layer.

11. The antenna module of claim 10, wherein the routing unit further includes a via formed through a plurality of layers to connect the first point and the fourth point.

12. The antenna module of claim 1, further comprising a connector positioned under the mounting unit and including a ball grid array (BGA) and a molding structure to electrically connect the communication circuit and a control, power, or IF signal provided from the communication circuit to a main circuit board of an electronic device.

13. The antenna module of claim 11, wherein a sub-array structure forming the plurality of first antenna elements has a plurality of groups arranged side by side on at least one layer of the antenna unit, one of the plurality of groups having an m×n array (wherein m and n are integers) with respect to a patch type.

14. The antenna module of claim 1, wherein the antenna unit includes a stack of a plurality of layers, wherein the plurality of first antenna elements include a patch-type or slot-type radiator, and wherein the plurality of first antenna elements are arranged on an arbitrary layer among the plurality of layers, and a plurality of second antenna elements for increasing a bandwidth are arranged in parallel to the plurality of first antenna elements on a layer disposed adjacent to the arbitrary layer.

* * * * *